Dec. 19, 1967     H. M. SMITH     3,359,425
SENSORY PERCEPTION DEVICE
Filed June 3, 1964                3 Sheets-Sheet 1
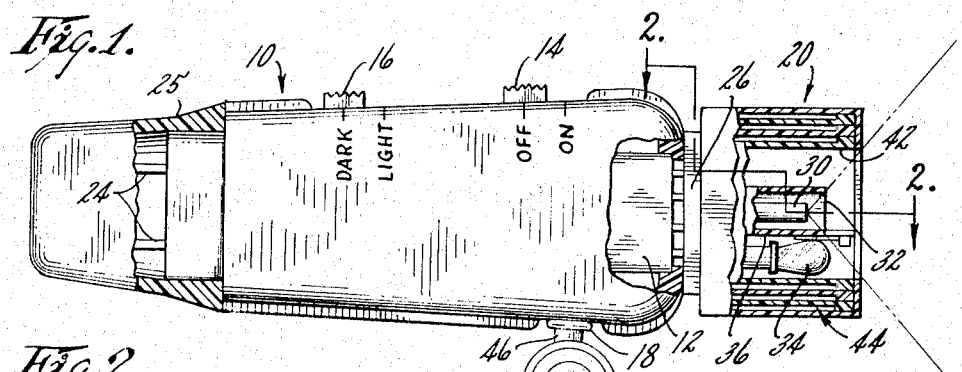
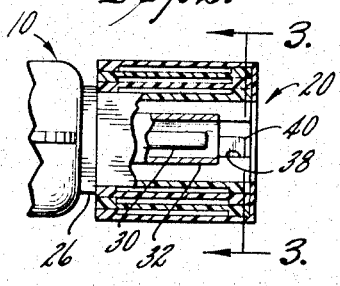
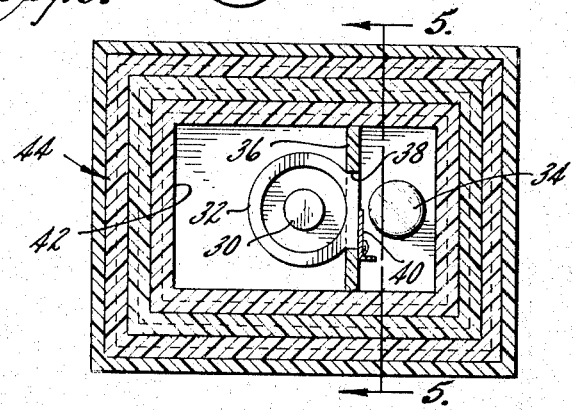
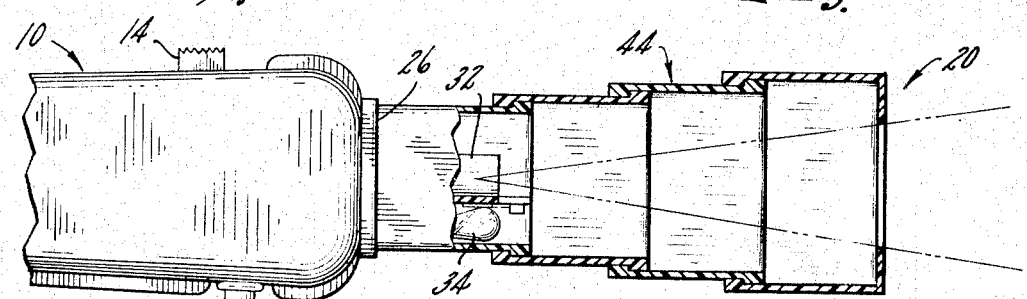
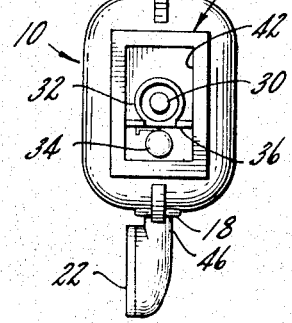
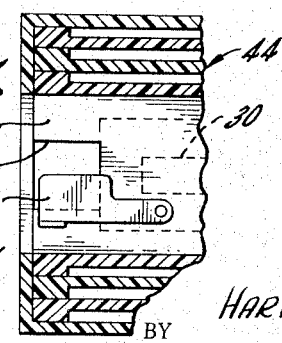
INVENTOR.
HARRY M. SMITH,
BY Trask, Jenkins & Hawley
ATTORNEYS.

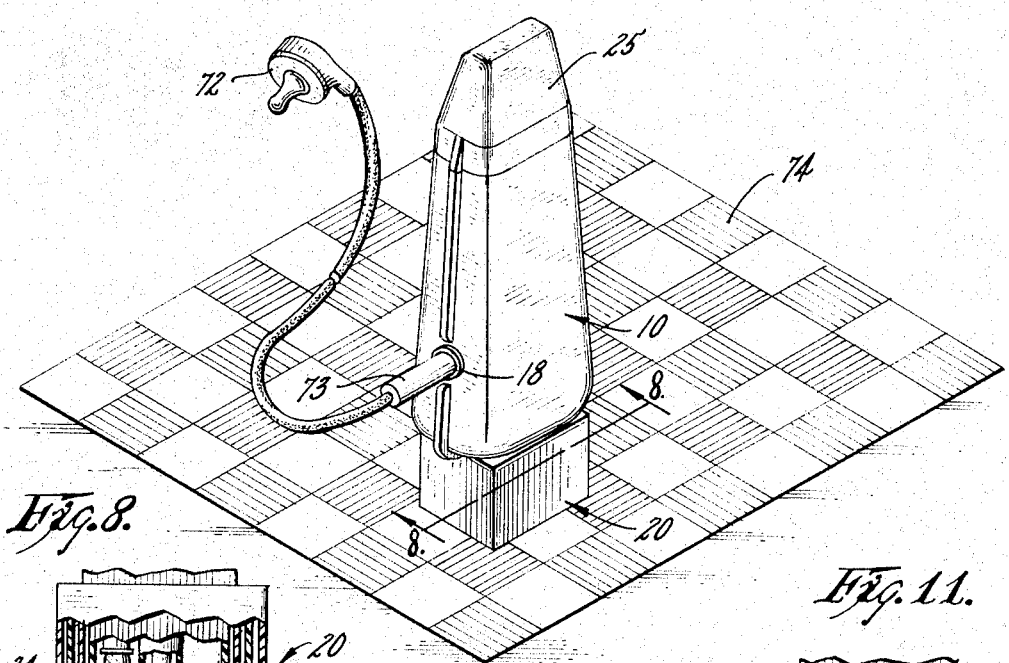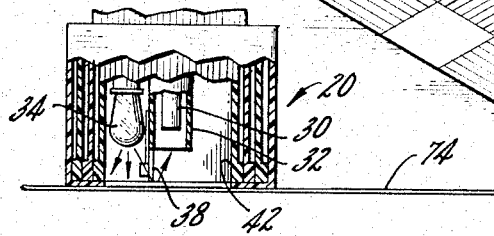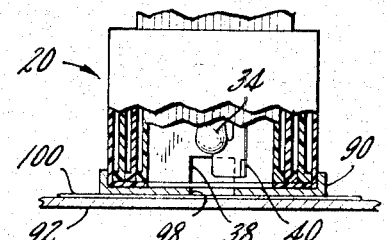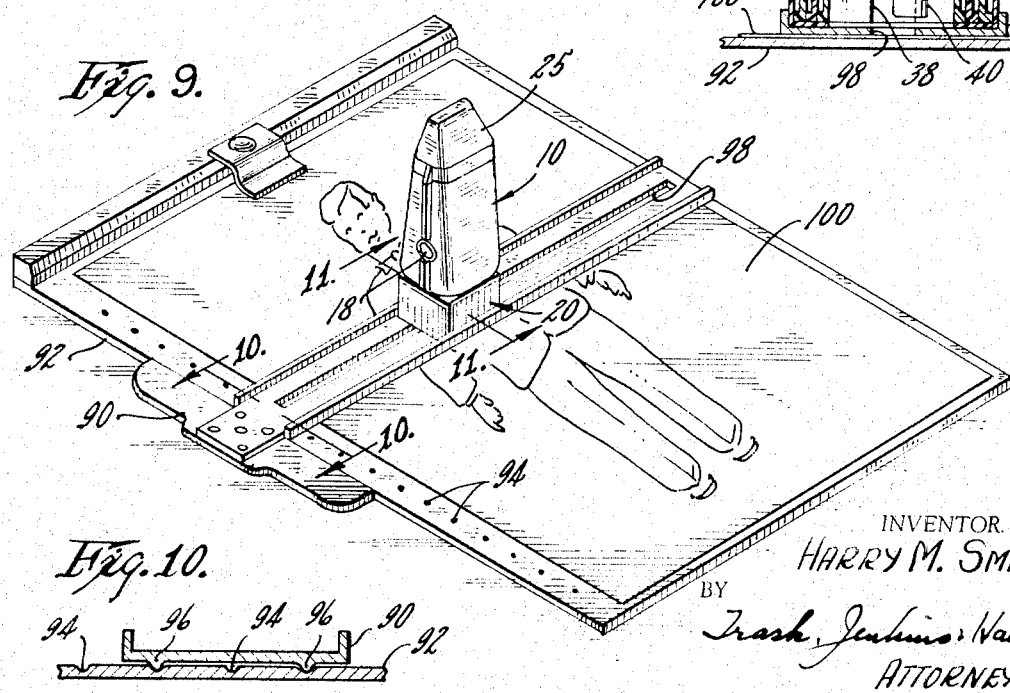

Dec. 19, 1967 H. M. SMITH 3,359,425
SENSORY PERCEPTION DEVICE
Filed June 3, 1964 3 Sheets-Sheet 3
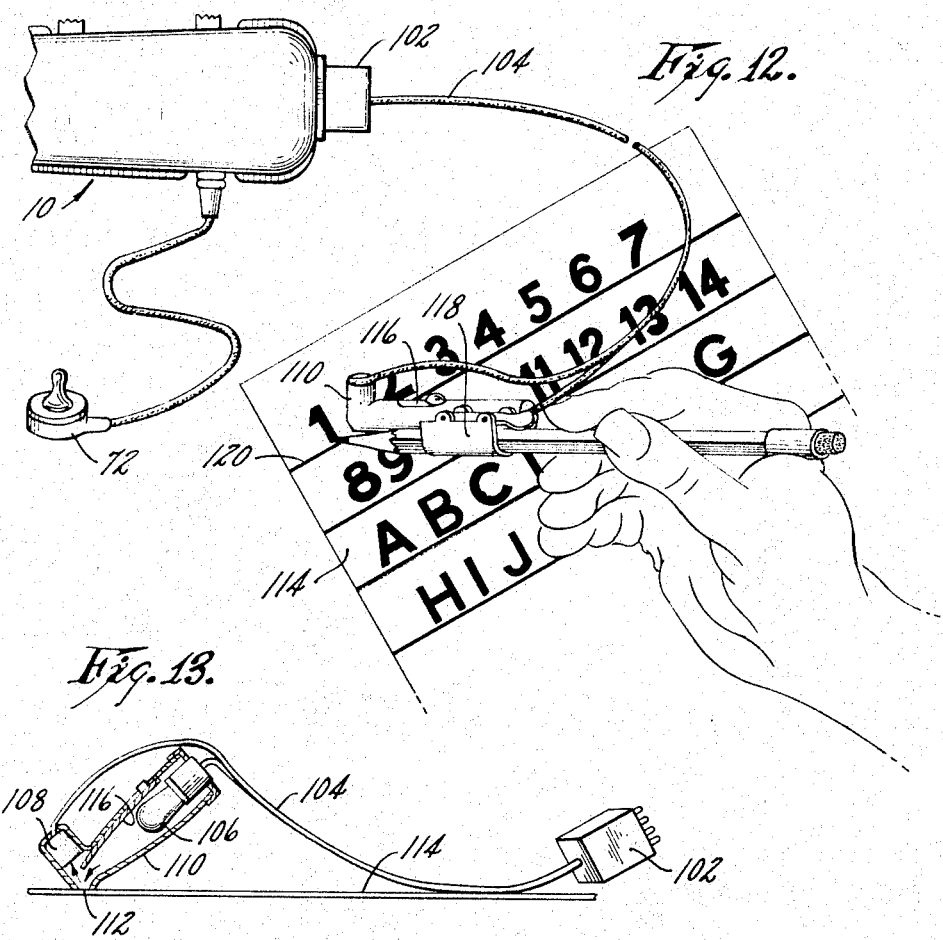
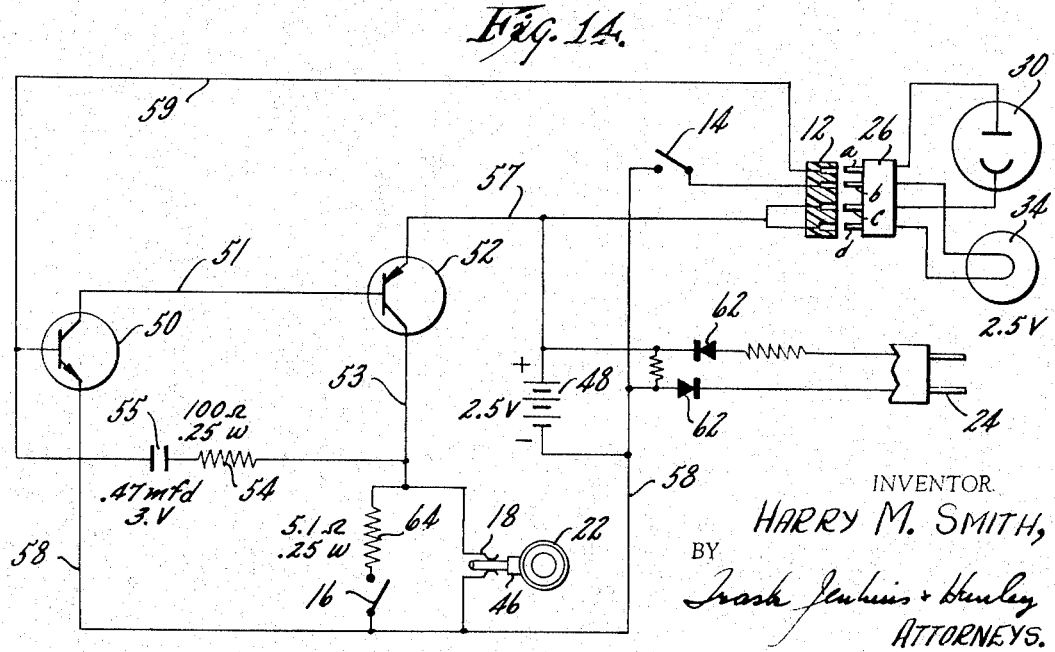
INVENTOR.
HARRY M. SMITH,
BY
Frank Jenkins + Hensley
ATTORNEYS.

United States Patent Office 3,359,425
Patented Dec. 19, 1967

3,359,425
SENSORY PERCEPTION DEVICE
Harry M. Smith, Lafayette, Ind.
(R.R. 1, West Point, Ind. 47992)
Filed June 3, 1964, Ser. No. 372,302
9 Claims. (Cl. 250—222)

ABSTRACT OF THE DISCLOSURE

A sensory perception device for use by the blind has an elongated housing to be held and directionally oriented by the hand. A forwardly-exposed light-cell is responsive to incident light in a limited angle, and controls an oscillator circuit which drives an output speaker which may be sensed either by sound or touch. A control switch shifts the circuit between two operating modes, one, a cut-off mode used for sensing black and white and for sensing the presence and direction of a light source, and another, a gradient mode used for sensing degrees of light, shades of color, etc. A lamp in the head provides light for sensing reflectance characteristics. The lamp and cell are in a replaceable plug to permit use of other sensing elements with the same unit.

---

This invention relates to apparatus especially adapted for use by the blind for perceiving the presence, quantity and direction of light, for distinguishing the color or shades of printing and other pictures and patterns on a surface, and also for testing or evaluating other conditions.

It is the principal object of the invention to provide a practical and convenient sensory perception device adapted for practical use by the blind to perceive, test, and evaluate various sensory and other conditions, particularly the presence, quantity and/or direction of both incident and reflected light; which will be readily useable by the blind for numerous purposes such as: perception of environmental conditions, guidance of his movements relative to light sources or by distinguishing different light values such as from a sidewalk and an adjacent lawn or street, perceiving the color differences and pattern of textiles, pictures, and the like and thereby "seeing" the pattern or picture, tracing and scanning printed matter and thereby reading the printing, tracing and guiding written matter and thereby enabling the blind to write with a pencil or like writing instrument, etc. It is a further object of the invention to provide a practical sensoy perception device which will be operable at two different sensitivity ranges to adapt it for different usages; which will include means to increase the directional characteristics of its light response; which will combine a light source in cooperative relation with a light sensing cell for close evaluation of reflectance of pictures, printed matter and the like; which can observe sufficiently small areas to sense the lines of printed letters, which will take interchangeable sensing heads and attachments for sensing, evaluating and/or testing different sensory and other conditions; which will permit the user to receive information either by hearing or touch; which will have a relatively simple and reliable electrical circuit; and which as a photo-sensitive device will operate in the dark (or when suitably set) to produce a periodic "beep" to indicate its location and permit its user to find it by sound; and which will be simple and practical in its construction and reliable and convenient in use. It is a further object of the invention to provide various interchangeable heads and accessories to extend the usefulness of the basic unit.

In accordance with the invention, the sensory perception apparatus comprises a basic unit of a size and shape to be held and directionally oriented in the hand, with a sensing head at the front, preferably mounted on the unit by a plug connector for ready replacement and interchangeability with other sensing and test devices. The basic unit, which may be referred to as an oscillator unit, contains a battery-powered oscillator circuit having a bias or control loop into which a photo-conductive or other resistance-type sensing element of the sensing head is connected to vary the resistance of the control loop in response to the sensing function. The oscillator unit desirably includes an output jack to connect into the circuit either a direct-mounted audio-touch speaker or a cable-connected earphone or other output signal device. The unit includes a sensitivity switch for selection between two operating ranges, one range in which the sensing response produces a continuous output tone of proportionately-varying pitch, and a second range in which the circuit operates substantially at cut-off so that an on-off signal is produced in response to the presence or absence of a predetermined sensed value or condition. The operating characteristics of the circuit are desirably made such that when the connected photo-conductive head is connected and receives no light, or when the head is unplugged so that the control loop is open, the oscillator unit will operate to produce periodic "beeps" for purposes of locating the device by sound. The battery of the basic oscillator unit is desirably rechargeable, and the unit includes a charging circuit connected to a standard 110 volt A.C. plug by which the unit can be connected to a standard supply receptacle.

The plug connector between the oscillator unit and the sensing head may be a four-prong connector comprising a receptacle mounted on the oscillator unit and adapted to receive the prong plug of any of various sensing heads and test units.

A light-responsive sensing head desirably includes a photo-conductive cell in which the resistance varies with incident light, mounted in a forwardly-open compartment in the head and arranged to be connected into the control loop of the oscillator circuit when the head is plugged into the socket of the oscillator unit. The light-responsive head may normally respond to incident light over a wide angle, and may have a telescopic shade or other means for reducing the angle of observed light in order to increase the directional response of the device, so that with a narrow directional response, the apparatus can be used by the blind to determine direction relative to a light source, for example, a street light. The light-responsive head also desirably includes a small lamp shielded from the light-sensitive cell by a wall having a shuttered aperture at its forward end, through which the cell will respond to light reflected from the lamp by a surface against which the unit is held. The lamp is connected to the battery of the oscillator unit by prongs of the plug connector, and is controlled by a switch. The lamp and cell combination enables the device to be used at close range to sense shades of color and to sense differences between printed matter and its background. In such use, the device can be used to trace or scan pictures and printing and the like, and may be used either free-hand or with accessories which guide the scanning movements of the device.

A modified light-responsive device for use by the blind to "read" printed matter and to guide a writing instrument comprises a small light source and a small light-responsive cell in a compact housing having a small observation aperture, and connected to a pencil holder for freedom of movement, this is desirably a remote unit connected to the oscillator by a flexible cable.

A heat-responsive sensing head for use with the oscillator unit may comprise a temperature responsive resistance element mounted on or connected to a plug received on the oscillator unit to vary the resistance in its control loop and thus to vary the tone of its output signal in response to temperature. For evaluating the temperature, the heat-responsive head desirably includes a comparator circuit containing a variable resistor calibrated in degrees. A momentary-throw switch disconnects the temperature responsive element and replaces it with the calibrated variable resistor. The user compares the signal tones produced, sets the variable resistor to produce the same tone as the temperature responsive element, and observes the position of the variable resistor to ascertain the temperature.

The accompanying drawings illustrate the invention.

In such drawings:

FIG. 1 is a side elevation of a device embodying the invention;

FIG. 2 is a section taken on the line 2—2 of FIG. 1;

FIG. 3 is a section on an enlarged scale, taken on the line 3—3 of FIG. 2;

FIG. 4 is a side elevation similar to FIG. 1, showing the telescopic light-shade in extended position;

FIG. 5 is a section taken on the line 5—5 of FIG. 3 and showing a shutter for the aperture between the lamp and the light cell;

FIG. 6 is a front view of the device shown in FIG. 1;

FIG. 7 is a view showing the use of the device of FIG. 1, with an earphone substituted for its audio-touch speaker, used free-hand for scanning sheet material containing a pattern of different colors or shades;

FIG. 8 is a side elevation of the sensing device shown in FIG. 7, with parts broken away to show the light path;

FIG. 9 is an isometric view showing an accessory board and slotted T-square with which the device of FIG. 1 may be guided in a linear scanning movement;

FIG. 10 is a fragmental view showing reference means for locating the position of the T-square on the board of FIG. 9;

FIG. 11 is a sectional view showing the relationship of the sensing element to the T-square of FIG. 9;

FIG. 12 is a view showing the oscillator unit of FIG. 1 equipped with an earphone output unit and with a compact sensing unit adapted to trace printed matter and to guide a writing instrument;

FIG. 13 is a sectional view of the sensing unit of FIG. 12; and

FIG. 14 is a wiring diagram of the device shown in FIG. 1.

The device shown in FIG. 1 comprises an oscillator unit 10 adapted to be carried in the hand and provided with a receptable 12 at its forward end for the reception of the connector plugs of various interchangeable sensing devices such as the light sensing device 20 shown in FIG. 1. The oscillator unit has an on-off switch 14 for the lamp of the sensing device 20 and a sensitivity switch 16 for changing the operating range of the oscillator circuit. The unit has an output jack 18 for an output signal device, here shown as a small audio speaker 22 with its diaphragm exposed for use as a vibrator unit to be observed by touch. The basic unit 10 also desirably includes a conventional two-prong plug 24 for connection to a standard 110-volt A.C. outlet for charging the battery, and this may be covered by a cap 25.

The light-responsive head 20 shown in FIGS. 1–6 comprises a base 26 having four prongs a–d adapted to contact the four sockets of the receptacle 12 and to support the head 20 on the oscillator unit 10.

The head 20 has a photo-conductive cell 30 housed in a central, forwardly-open tubular housing 32 which terminates short of the front face of the device 20. A lamp 34 is housed in a separate compartment beside the light-responsive element 30 and is shielded therefrom by a wall 36 having a notch-shaped aperture 38 at its front edge so that light from the lamp 34 can be reflected to the element 30 by a surface disposed against the front of the head 20. As shown in FIGS. 3 and 5, the wall 36 may carry a manually operable shutter 40 for varying the size of the notch aperture 38.

The head 20 is conveniently rectangular in cross-sectional shape, and has the sensing element 30 located centrally therein and the lamp 34 at one side. The light cell 30 is so positioned relative to its housing 32 and the inner wall 42 of the head that it is normally responsive to light received over a wide angle as indicated in FIG. 1. For purposes of narrowing the light-responsive angle of the cell 30, the head 20 has a telescopic shade 44 composed of a plurality of telescopic units which can be extended as shown in FIG. 4. This gives the head 20 directional characteristics so that it may be used to sense the direction from which the light is received, and to permit its use by a blind person to guide himself relative to a light source, such as a street light.

The output speaker 22 shown in FIGS. 1–6 is directly mounted on the stem 46 received in the jack 18. Its output signal may be observed either by hearing or by touch.

Various oscillator circuits may be used in the oscillator unit 10. One such circuit which I have used is shown in FIG. 14 by way of illustration.

In FIG. 14, the photo-conductive cell 30 of FIG. 1 is shown as a variable resistance connected between prongs a and c of the four prong plug 26, while the lamp 34 is connected between prongs b and d of that plug. The plug is shown opposite its mating receptacle 12, in which prongs c and d are joined and connected to the positive side of a battery 48, while the prong b is connected through switch 14 to the negative side of the battery.

The oscillaor circuit is a multivibrator-type circuit having an NPN transistor 50 and a PNP transistor 52. The collector of the NPN transistor 50 is connected by a wire 51 to the base of the PNP transistor 52, the collector of the transistor 52 is connected to a wire 53 and through a resistor 54 and a condenser 55 to the base of the transistor 50, the emitter of the transistor 52 is connected by a wire 57 to the positive side of the battery 48, and the emitter of the transistor 50 is connected by a wire 58 to the negative side of the battery 48. The positive side of the battery 48 is also connected, by way of prongs a and c of the separable connector 12–26, through the photo-conductive cell 30 and a wire 59 to the base of the transistor 50, to form a control loop in which the photo-conductive cell controls the bias on the transistor 50 and on the oscillator circuit. The output jack 18 is connected between the wires 53 and 58. The sensitivity switch 16 is in series with a resistance 64 between the wires 53 and 58 in parallel with the output speaker 22.

For recharging the battery 48, its opposite sides are connected to a charging circuit comprising a pair of oppositely disposed silicon rectifiers 62 and a resistor grid, connected to a 110-volt A.C. input plug 24.

Values of the components used in an embodiment of the circuit of FIG. 14 are shown on the drawing by way of illustration. Similar and other oscillator circuits may be formed with other components and values, to perform similar or equivalent functions for the intended purposes.

The circuit shown, with the sensitivity switch open, will be sufficiently sensitive to operate at cut-off. When the photo-conductive cell 30 receives a substantial amount of light, the resistance of the cell will be reduced to a point which will cause the oscillator to cut off so that no output signal will occur from the output speaker 22. When the cell 30 receives less light, however, its resistance will rise above the cut-off point, and the oscillator will oscillate to produce an output tone signal from a speaker 22, observable either by hearing or by touch.

With the sensitivity switch 16 open, as described, the device of FIG. 1 is adapted to sense the presence or absence of a predetermined level of light. It is therefore adapted to distinguish light and dark areas of printed matter. With the lamp 34 turned on, the device may be used as shown in FIG. 7 to distinguish between light and dark areas of a pattern such as the checkered pattern shown in FIG. 7.

Movement of the shutter 40 will adjust the device to vary its cut-off point and to adapt it for varying conditions, such as varying shades of paper and of contrast between paper and printing.

In the use of the device illustrated in FIG. 7, the close-coupled speaker 22 is replaced by an earphone 72 connected by a flexible cable to a plug 73 inserted in the jack 18. The device is used free-hand and is held against the paper or other material 74 bearing a pattern. As indicated in FIG. 8, light from the lamp 34 is cast downward onto the surface of the material 74 and is reflected therefrom to the light-responsive element 30 through the notch 38 in the wall 36.

Assume that the pattern of FIG. 7 is a black and white pattern. (Similar but more precise operation will occur with the smaller-size tracing head of FIGS. 12–13, described below.) When the underlying paper is white, the light reflected thereby to the cell 30 (or 108 in FIG. 13) will be sufficient to cause the oscillator to cut off, and no tone will be heard from the output speaker 22 (or 72). When the head is moved across a black area on the paper, however, the light reflected to the cell will be reduced and the oscillator will oscillate to produce a tone signal. A blind person is able with the device to scan or trace printed matter, pictures, drawings, etc., and thus obtain a perception of such matter.

The device as described above will not only distinguish between light and dark areas of a pattern, as between black and white of printed matter, but will also sense shades of dark, and sense different colors having different reflectance characteristics. The pattern of FIG. 7 is shown with different shading representing different color values. The device will produce different tones in response to such different colors, and will not only read a black and white pattern but also a pattern of different shades and reflectances. A blind person can thus use it to select his clothes, and for other purposes of discerning patterns. In the same sensitivity range of operation, that is, with the switch 16 open, the device may be used in numerous other ways to provide the blind with a perception of the presence or absence of light.

The circuit shown also provides a further valuable function. With the sensitivity switch 16 open, if substantially no light falls on the cell 30, or if the head 20 is removed from the oscillator by disconnecting the plug 26 from the receptacle 12, the circuit will operate to produce periodic short sounds—beeps—at a frequency of the order of one or two per second. This periodic beep signal serves as a locating signal. A blind person can leave the unit in this condition, for example, when he goes to bed, and will be able to find the device by sound.

The operation of the circuit of FIG. 14 under these conditions is as follows. The capacitor 55 charges and discharges at a relatively low frequency, to produce periodic pulses. Leakage current through transistor 52 is coupled through resistor 54 and capacitor 55 to the base of transistor 50. This causes transistor 50 to begin to conduct and to take its collector current from the base of transistor 52, thereby causing the latter transistor to conduct. Both transistors continue in a conductive state until capacitor 55 charges sufficiently to cut off transistor 50, which in turn cuts off transistor 52. Most of the current during this conductive stage passes through the speaker 22 while a small proportion supplies the base current to transistor 50. The capacitor is then discharged by leakage current which flows through the circuit from the positive side of battery 48 through the emitter-base junction of transistor 52, conductor 51, the collector-base junction of transistor 50, capacitor 55, resistor 54, and speaker 22, to the negative side of the battery. When the capacitor has discharged sufficiently, transistor 50 will again begin to conduct and the capacitor will recharge. Thus, the circuit functions as a low frequency oscillator and continuously generates periodic pulses applied to the speaker 22 to produce periodic sounds.

The device may be turned completely off and deenergized by opening the sensitivity switch 16 and disconnecting both the sensing head 20 and the output speaker 22.

When the sensitivity switch 16 is closed, the oscillator is less sensitive and will operate continuously on a gradient portion of the light-response curve, and the output tone or signal will be generally proportional to the amount of light which falls on the photo-conductive cell. With bright incident light, the cell has low resistance and the output signal is a high-pitched tone, whereas with less incident light, the resistance increases and the tone pitch decreases.

With this less-sensitive setting, with the switch 16 of FIG. 1 in its "Light" (closed) position, the device has many uses. By manipulating the device, a blind person can perceive the amount and direction of light and can use the device in many ways for guiding his movements. It can guide him toward a source of light, for movement around his home or on the street. It can sense oncoming headlights. It can tell him the brightness of the day. It can sense the different reflections from a sidewalk and the grass at the side of the sidewalk to guide his movements. It can warn of the end of the sidewalk, as at a street crossing. It can sense shadows and silhouettes of obstructions and of moving objects. Some of these uses will be facilitated by extending the hood 44 to give greater directional characteristics to the sensing head.

The device with this "Light" setting of the switch 16 can also be used to distinguish colors by comparative reference to standard color samples. It will help the blind to select and distinguish clothes, for it will enable him to distinguish between solid color material and patterned material.

In the use of the device as shown in FIGS. 9–11, the unit 10 is assumed to have an earphone 72 connected to its jack 18 as in FIG. 7 but which is omitted from FIG. 9 for convenience of illustration. In this use, the sensing device 20 is guided in linear scanning movements by a slotted T-square 90. For reference in locating the T-square on the board 92, the board 92 has a series of dimples 94 along its left edge and the T-square has a pair of bosses 96 which fit in such dimples. The stem of the T-square is channel shaped and of a width to receive and guide the sensing device 20. A central longitudinal slot 98 underlies the lamp 34 and the light cell 30 of the sensing device 20 in the operative relationship, so that the cell will be responsive to light reflected from the underlying surface. Various materials can be fastened on the board 92 and can be scanned in a regular linear pattern with the aid of the T-square. As shown, the sheet 100 carries a simple picture of a human figure. Tests have shown that a blind person can readily visualize and identify such pictures by scanning them with the device of this application.

In the modification shown in FIGS. 12 and 13, the oscillator unit 10 is provided with an earphone 72 as before. The sensing device used is light sensitive and is connected to the oscillator unit 10 by a plug 102 and a flexible cable 104. It comprises a small and compact assembly of a lamp 106 and a light-responsive unit 108 housed in separate branches of an L-shaped housing 110 having a corner opening 112 at which sensing or observation of an underlying sheet 114 occurs. The housing 110 desirably has a sliding shutter 116, adjustable manually to vary the aperture through which light is reflected to the light-responsive element 108. This compact sensing device is connected to a clip 118 adapted to receive a pencil or other writing instrument to assist a blind user in writing on the sheet 114. The sheet 114 carries a series of conventional guide lines 120, preferably printed in black ink.

The operation of the device of FIGS. 12–13 is similar to that of the device in FIG. 1, with the sensitivity switch in its open or "Dark" position. Light from the lamp 106 falls on the small area of the sheet 114 which is exposed through the opening 112, and is reflected from that small area to the cell 108. When the exposed area of the sheet is white, no signal is produced by the oscillator 10, but when the exposed area is black, a tone signal is produced. By moving the sensing head 110 over the sheet 114, a blind user can readily locate the guide lines 120 and by reference to them can intelligibly write with the pencil 119, and can keep his writing in line, and in order. By scanning areas located by reference to the guide lines 120 with the sensing head 110, the user can "read" the marks he has made and other marks or letters which may have been printed or drawn on the sheet 114. With freehand scanning with this unit, one blind user was readily able to read newspaper headlines.

I claim:
1. A sensory perception apparatus adapted for use by the blind, comprising
  an elongated housing of a size and shape to be held and directionally oriented by the hand,
  a forwardly-exposed photo-sensitive resistance cell to sense light appearing at the forward end of the housing, the cell and housing being so constructed and arranged that the cell is responsive to light appearing within a limited forward angle whereby the response and orientation indicate the direction of incident light,
  an electrical oscillator circuit in said housing, an output signal device connected to said circuit for operation thereby to produce a perceptible vibratory signal, said circuit having a control loop connected to include said photo-sensitive cell and controlling the operation of the circuit and signal device in response to photo-responsive resistance of said cell,
  a sensitivity switch on said housing and electrical means for selectively controlling said circuit to operate in a cut-off sensitivity range in which the output signal will be cut off in the presence of a predetermined quantity of light on the cell, and alternatively to operate in a gradient range in which the output signal will vary in pitch over an audio range depending on the quantity of light on the cell.

2. Sensory perception apparatus as defined in claim 1 with the addition of a lamp shielded from direct illumination of said cell and disposed to provide light for reflection to said cell from a surface located in sensing position relative to said cell, a lamp switch controlling said lamp, said sensitivity switch and electrical means for selectively controlling said circuit being operable in a cut-off sensitivity range in which the output signal will be cut off when light from said lamp is reflected from a white surface and actuated when the surface is dark.

3. Sensory perception apparatus as defined in claim 1, with the addition that said output signal device is an audio speaker having a diaphragm and said diaphragm is positioned and arranged to be engaged by the finger of the user for observation by touch.

4. Sensory perception apparatus as defined in claim 1, in which said oscillator circuit includes a condenser and circuit means to periodically charge and discharge said condenser, said circuit means including said signal device and sensitivity switch in parallel and being so constructed and arranged that with such switch open and in the absence of actuating light on said cell in the control loop, and when the control loop is open, said circuit means will alternately charge and discharge said condenser and thereby cause said output device to produce periodic short audible signals at a frequency of the order of a few per second or less, whereby the apparatus can be located by sound.

5. Sensory perception apparatus for use by the blind, comprising
  an elongated narrow housing of a size and shape to be held in the hand of the user and freely moved in scanning and tracing movements, and having a forwardly presented observation opening,
  a forwardly exposed photo-sensitive resistance cell positioned to be responsive to light appearing at said opening,
  a shielded lamp mounted in shielded relation with respect to said cell and adapted to cast light for reflection to said cell from a surface exposed at said opening,
  an electrical oscillator circuit having a control loop including said cell and having a vibratory output signal device energized in response to variations in light received by said cell from said observation opening,
  said signal device being carried by said housing in position to be touched by the hand in which the device is held, and thereby to permit a blind user to manually move the device over a surface and obtain from such signal device a tactile sensory perception of the location and pattern of the reflectance characteristics on the surface.

6. Sensory perception apparatus as defined in claim 5 in which said electrical oscillator circuit is contained in said housing and said apparatus is a self-contained hand-held unit.

7. Sensory perception apparatus, comprising
  an elongated housing of a size and shape to be held and directionally oriented in the hand of the user,
  a first separable connector part at the front end of said housing adapted to interchangeably receive sensing heads and having a plurality of electrical contacts for connecting a sensing element in the head to an electrical circuit,
  an electrical oscillator circuit in said housing, an output signal device connected to said circuit for operation thereby to produce a perceptible audio or other vibratory output signal, said circuit including a control loop connected to said electrical contacts for controlling the operation of said circuit and signal device in response to the resistance in said control loop, and at least one sensing head including a resistance-containing sensing circuit connected to electrical contacts of a second separable connector part receivable by said first connector part for connecting said sensing circuit to provide a sensing-responsive resistance in said control loop.

8. Sensory perception apparatus as defined in claim 7, in which said sensing head comprises a light-responsive element physically mounted in and supported by said head and positioned to be responsive to light appearing within a predetermined forward angle.

9. Sensory perception apparatus as defined in claim 7, in which said sensing head comprises a plug element receivable by said first connector part, connected by a flexible cable to a tracing head comprising a light responsive cell adapted to be moved over a paper as a pencil to sense and trace marks on such paper.

(References on following page)

References Cited

UNITED STATES PATENTS

| | | | |
|---|---|---|---|
| 1,372,360 | 3/1921 | McNeill | 35—38 |
| 1,820,357 | 8/1931 | Lindstrom et al. | |
| 2,420,716 | 5/1947 | Morton et al. | 250—239 X |
| 2,468,042 | 4/1949 | Cranberg. | |
| 2,530,437 | 11/1950 | Marks | 35—38 |
| 2,629,054 | 2/1953 | Craig | 331—66 X |
| 2,721,267 | 10/1955 | Collins | 331—66 |
| 2,866,279 | 12/1958 | Surber | 35—35 |
| 2,920,247 | 1/1960 | Fisher | 331—66 X |
| 2,988,708 | 6/1961 | Schmidt | 331—65 X |
| 3,007,259 | 11/1961 | Abma et al. | 35—35 |
| 3,089,034 | 5/1963 | Meade | 250—214 |
| 3,221,317 | 11/1965 | Ferrigno | 250—206 X |
| 3,245,158 | 4/1966 | Schwartz | 250—219 |
| 3,281,715 | 10/1966 | Folz et al. | 331—113 |
| 3,284,707 | 11/1966 | Clinton | 324—62 |

OTHER REFERENCES

Benham, "Aid for the Blind," Electrical Engineering, February 1947, pp. 178–182.

WALTER STOLWEIN, *Primary Examiner.*

RALPH G. NILSON, *Examiner.*

M. A. LEAVITT, *Assistant Examiner.*